United States Patent

[11] 3,583,822

[72] Inventors Robert H. Alexander;
Walter F. Broom, III; David Anthony
Boatwright; Clyde David Thackston, all of
Columbia, S.C.
[21] Appl. No. 772,130
[22] Filed Oct. 31, 1968
[45] Patented June 8, 1971
[73] Assignee Rockwell Manufacturing Company
Columbia, S.C.

[54] PORTABLE POWER TOOL
14 Claims, 8 Drawing Figs.

[52] U.S. Cl. .................................................... 408/11,
408/137
[51] Int. Cl. .................................................... B23b 45/14,
B23b 47/24
[50] Field of Search .......................................... 77/13, 32.8,
32.5, 32.7, 32.8, 34.4, 32.9, 34.7

[56] References Cited
UNITED STATES PATENTS
3,487,729  1/1970  Juhasz et al. ..................... 77/13
2,893,272  7/1959  Linsker ............................. 77/32.5

*Primary Examiner*—Francis S. Husar
*Attorney*—Marechal, Biebel, French & Bugg

ABSTRACT: A portable tool incorporates a motor having a shaft connected through a gear train to drive a gear slidably mounted on a spindle having an external thread and movable axially in a direction normal to the axis of the motor shaft. A feed gear having internal threads is mounted on the spindle and is selectively driven at a first speed to produce positive feed of the spindle and at a second speed to effect rapid advancement of the spindle. Collars are adjustably mounted on the spindle and are effective to provide precise depth control and automatic disengagement of the positive feed and retraction of the spindle.

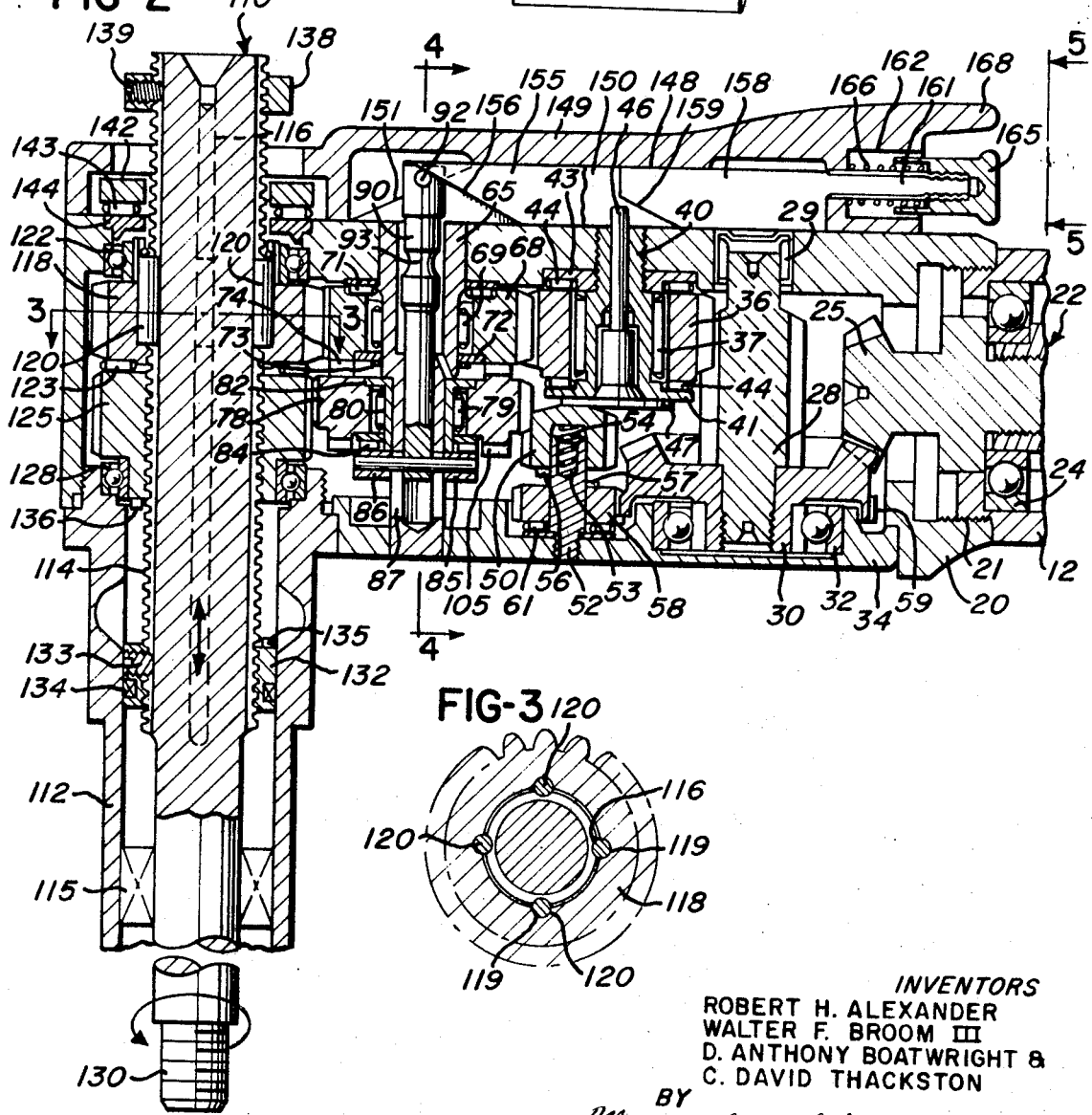

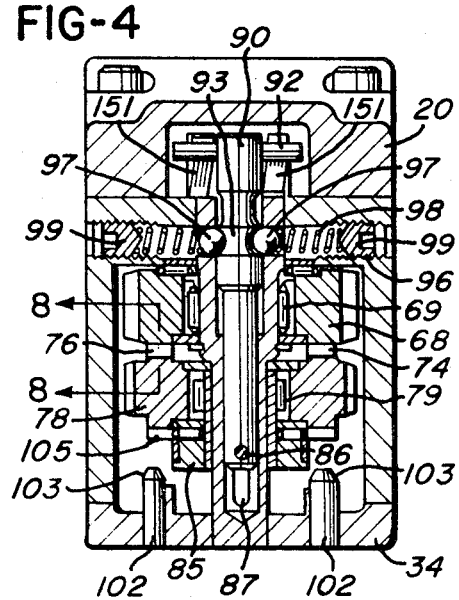
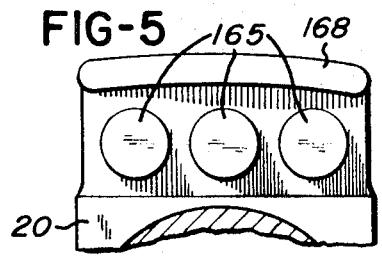
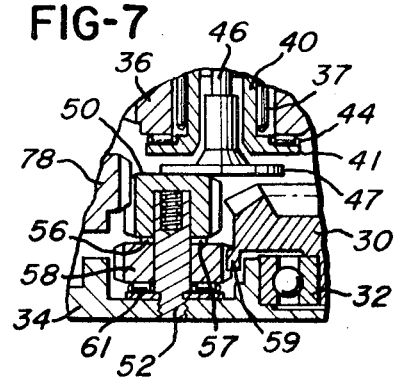
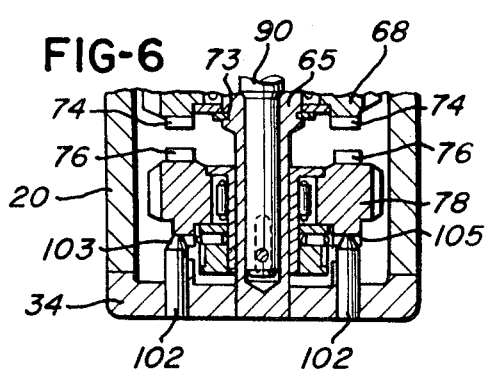
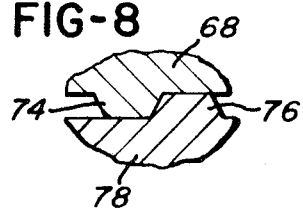

3,583,822

1

PORTABLE POWER TOOL

BACKGROUND OF THE INVENTION

In a portable power tool such as disclosed in U.S. Pat. No. 2,893,272 which issued to the assignee of this invention, it is frequently desirable for performing a number of machining operations to provide a positive feed of the rotatable spindle as well as an adjustable depth control for precisely limiting the feed stroke of the spindle. Furthermore, it is desirable to provide for rotation of the spindle after it reaches the end of the feed stroke to assure "clean up" of a countersinking, spot-facing or boring operation.

For some machining operations, especially in the aircraft industry, it is also desirable for the portable power tool to incorporate a spindle having a substantial stroke. To provide this feature, portable power tools have been constructed with the spindle extending laterally through the housing with its axis perpendicular to the motor axis so that a spindle of any length may be employed depending upon the particular machining operation. Furthermore, when drilling a deep hole in some materials, it is desirable to employ a "woodpecking" operation whereby the drill is positively fed a selected distance and is then retracted to remove chips from the hole after which the drill bit is advanced back into the hole to continue the drilling operation. To provide for efficiency in a "woodpecking" operation, it is desirable for the power tool to incorporate means for rapidly retracting and advancing the spindle to minimize the nonmachining time when chips are being cleaned from the hole. Moreover, it is desirable to provide all of these features in a tool having a compact housing and with mechanism which is economical and simple in construction and assembly.

SUMMARY OF THE INVENTION

The present invention is directed to an improved compact portable power tool which provides a positive feed spindle capable of an unlimited stroke and which incorporates the additional features of rapid advancement of the spindle, precise depth control and pushbutton controls which can be conveniently actuated. In addition, the tool of the invention provides for automatic release of the positive feed at a precise forward limit of the spindle stroke after a predetermined axial force is applied to the spindle and for automatic release of the spindle retraction without creating substantial torsional or axial forces within the spindle drive and feed system.

In accordance with a preferred embodiment of the invention, a portable power tool includes a compact housing which supports a spindle for both rotary and axial movement. A drive gear is spline mounted on the spindle for relative axial movement and is driven through a gear train powered by the drive shaft of an air motor having its axis disposed normally to the axis of the spindle. A feed gear is threadably mounted on the spindle and is driven by a clutch gear which is selectively driven at one speed by the gear train to produce normal positive feeding of the spindle and at a higher speed by a rapid advance gear system to provide rapid advancement of the spindle. The clutch gear is restrained from rotating to effect rapid retraction of the spindle, and the shifting of the clutch gear and the rapid advance gear are controlled by three selectable pushbuttons each depressible from the rear in a direction parallel to the axis of the motor shaft to provide for conveniently using the tool.

BRIEF DESCRIPTION OF THE DRAWING

FIG. 1 is a perspective view of a portable power tool constructed in accordance with the invention;

FIG. 2 is a fragmentary axial section of the tool shown in FIG. 1;

FIG. 3 is a section taken generally on the line 3-3 of FIG. 2;

FIG. 4 is a section taken generally along the line 4-4 of FIG. 2;

FIG. 5 is a fragmentary view taken generally on the line 5-5 of FIG. 2;

FIG. 6 is a fragmentary section showing the gear system in position for retracting the spindle;

FIG. 7 is a fragmentary section showing the gear system in position to produce rapid advancement of the spindle; and FIG. 8 is a fragmentary section taken generally on the line 8-8 of FIG. 4.

DESCRIPTION OF THE PREFERRED EMBODIMENT

Referring to the drawings, FIGS. 1 and 2 show a portable tool incorporating an air motor 10 of the sliding vane type and including a generally cylindrical casing 12. Air is supplied to the motor 10 from a flexible air supply line 15 through a releasable fitting 16 and main control rotary valve 18. The motor casing 12 is coupled to a housing 20 by a threaded connection 21 (FIG. 2) and encloses a planetary reduction gear system 22 (partially shown) which is supported by a set of antifriction bearings 24 and serves to connect the motor drive shaft to an axially aligned beveled drive gear 25.

A spur gear 28 has an upper end portion supported by a needle bearing 29 and a lower end portion threadably connected to a beveled gear 30 supported by an antifriction bearing 32 mounted within a cavity formed within a bottom cover member 34 removably secured to the housing 20 by screws (not shown). The beveled gear 30 meshes with the beveled drive gear 25, and the spur gear 28 drives a spur gear 36 supported by a needle bearing 37 mounted on a hollow shaft 40 having an upper end portion threadably connected to the housing 20. A radial flange 41 forms the lower end portion of the hollow shaft 40 and cooperates with a hardened washer 43 to retain a pair of antifriction thrust bearings 44 positioned on opposite sides of the spur gear 36.

A control rod 46 is slidably supported by the hollow shaft 40 and includes a lower circular disclike portion 47 which engages the upper end of a spur gear 50 rotatably mounted on a stud shaft 52 having a lower end portion threaded into the cover member 34. An axially extending cavity 53 is formed within the upper end portion of the stud shaft 52 and retains a compression spring 54 which biases the gear 50 upwardly against the lower disc portion 47 of the control rod 46. A set of three tapered cam lugs 56 is formed on the lower end of the gear 50 and is adapted to engage a corresponding set of tapered cam lugs 57 formed on the upper end of a spur gear 58 which is supported by the shaft 52 and meshes with spur gear teeth 59 formed on the lower periphery of the bevel gear 30. An antifriction thrust bearing 61 is located adjacent the lower end of the spur gear 58 surrounding the stud shaft 52.

A hollow stepped shaft 65 extends downwardly through the housing 20 with its axis positioned parallel to the axis of the gear 28 and shafts 40 and 52. The upper cylindrical portion of the hollow shaft 65 is supported by the housing 20, and the lower solid end portion of the shaft 65 is supported by the cover member 34. A spur gear 68 is supported by a needle bearing 69 mounted on the upper portion of the hollow shaft 65 and is confined between an antifriction thrust bearing 71 and a thrust washer 72 retained by a snap ring 73 secured to the shaft 65.

A pair of diametrically spaced tapered cam lugs 74 FIGS. 2, 4, 6 and 8) are formed on the lower end of the gear 68 and are adapted to engage a correspondingly spaced pair of tapered cam lugs 76 formed on the upper end of a clutch gear 78 supported by a needle bearing 79 mounted on a tubular sleeve 80 slidably disposed on the lower end portion of the hollow shaft 65. The gear 78 is confined between an upper radial flange 82 formed on the sleeve 80 and an antifriction thrust bearing 84 retained by an annular collar 85 secured to the lower end of the sleeve 80 by a cross pin 86 which projects through aligned slots 87 formed within the lower end portion of the hollow shaft 65.

A control rod 90 is slidably mounted within the hollow shaft 65 and has a hole within its lower end portion for receiving the cross pin 86. A cross pin 92 extends laterally through a hole formed within the upper portion of the control rod 90, and a circumferential groove 93 is formed within the control rod below the cross pin 92. A set of diametrically aligned holes 96 (FIG. 4) are formed within the housing 20 and hollow shaft 65, and a pair of balls 97 are positioned within the holes for engaging the control rod. Each ball 97 is urged inwardly into the groove 93 by a compression spring 98 confined by an adjustable setscrew 99. Thus the balls 97 serve to form a releasable detent for retaining the clutch gear 78 and control rod 90 in the position shown in FIGS. 2 and 4.

Referring to FIG. 4, a pair of studs 102 are supported by the cover member 34, and each stud 102 has a frustoconical or tapered upper end portion 103. A pair of diametrically spaced tapered cam lugs 105 are formed on the lower end of the gear 78 and are adapted to engage the upper tapered end portions 103 of the studs 102 when the clutch gear 78 is shifted downwardly through a neutral position (FIG. 7) where it engages only the gear 50 and the gear 125.

An elongated spindle 110 extends vertically or laterally through the housing 20 and into a tubular support member 112 having an upper end portion threadably connected to the housing 20. The lower end portion of the tubular member 112 is adapted to be releasably attached to a fixture 113 which is secured to the workpiece W to be machined. The spindle 110 has an upper portion with an external left-hand acme thread 114 and a lower cylindrical portion which is supported by a needle bearing 115 retained within the tubular member 112. A series of four axially extending grooves 116 (FIG. 3) are formed within the threaded portion of the spindle 110. A drive gear 118 (FIG. 2) is mounted on the spindle 110 in mesh with spur gear 68 and has four uniformly spaced grooves 119 which align with the grooves 116 to receive a set of drive pins 120. The upper portion of the drive gear 118 is supported by an antifriction bearing 122, and an antifriction thrust bearing 123 is confined between the lower end surface of the drive gear 118 and the upper end surface of a feed gear 125 having internal threads engaging the external threads 114 on the spindle 110. The feed gear 125 meshes with the movable clutch gear 78 and has a lower end portion 127 supported by an antifriction bearing 128 retained within a counterbore in the upper end of the tubular support member 112.

The spindle 110 has a threaded forward end portion 130 for attaching a cutting tool such as a drilling, counterboring, reaming or a countersinking tool. A collar 132 is adjustably mounted on the threaded portion of the spindle 110 and is secured by a setscrew 133. A flexible seal 134 is carried by the collar 132 and engages the tubular support member 112. A square lug 135 is formed on the upper surface of the collar 132 and is adapted to engage a similar square lug 136 formed on the lower end portion of the feed gear 125 when the spindle 110 is retracted as will be explained later.

An annular collar 138 is adjustably mounted on the upper threaded end portion of the spindle 110 and is secured by a setscrew 139. The collar 138 is adapted to engage a thrust washer 142 supported by an antifriction thrust bearing 143 retained by a ring 144 mounted on the housing 20 and thereby form a positive stop for the downward feed of the spindle 110.

Three laterally spaced slots 148 (FIG. 2) are formed within a top cover 149 removably secured to the housing 20 by screws (not shown). An actuator blade 150 is mounted in one of these slots and has a downwardly sloping upwardly facing forward edge 151 which is adapted to engage one end of the pin 92 extending through the upper end portion of the actuator rod 90. Another actuator blade 155 is mounted within another slot 148 and has a downwardly facing forward tapered edge surface 156 adapted to engage the opposite end portion of the pin 92. A third actuator blade 158 is positioned between the actuator blades 150 and 155 and is slidably supported within the center slot 148. The blade 158 has a downwardly facing forward tapered edge surface 159 adapted to engage the upper end of the control rod 46 slidably supported within the tubular shaft 40. Each of the actuator blades 150, 155 and 158 has a rearward end portion 161 which extends into a corresponding cylindrical cavity 162 formed within the housing cover 149. A pushbutton 165 (FIGS. 2 and 5) is threadably mounted on the rearward end portion 161 of each actuator blade and telescopes within the corresponding cavity 162 against the bias of a compression spring 166 mounted on the end portion 161 of each actuator blade. The housing cover 149 has a rearwardly projecting lip 168 which projects over the pushbuttons 165 and serves as a protector against accidental depression of the pushbuttons.

When air is supplied to the motor 10, the drive gear 25 rotates the gear 118 and spindle 110 at a predetermined speed through the gear train including gears 30, 28, 36 and 68. To produce positive downward feeding of the spindle 110, the pushbutton 165 connected to the actuator blade 150 is depressed causing the forward edge surface 151 to cam the actuator rod 90 and the clutch gear 78 upwardly. The balls 97 (FIG. 4) are received within the groove 93 to form a detent for retaining the clutch gear 78 adjacent the gear 68 so that the lugs 74 engage the lugs 76.

Gears 68 and 118 have the same number of teeth whereas feed gear 125 has at least one less tooth than clutch gear 78. Thus rotation of the clutch gear 78 with the gear 68 produces rotation of the feed gear 125 slightly faster than the drive gear 118 causing the spindle 110 to feed downwardly at a positive predetermined rate for performing the selected machining operation. When the collar 138 engages the thrust washer 142, the gear 125 is pulled up tight against bearing 123 and gear 118 causing a torque buildup between gear 68 and 78 so that the sloping faces of the lugs 74 and 76 exert a separating force which cams gear 78 downwardly into a neutral position (FIG. 7). The downward movement of the clutch gear 78 causes the actuator rod 90 to eject the balls 97 outwardly into the holes 96 thereby overcoming the detent biasing force tending to hold the lugs 76 into engagement with the lug 74.

To retract the spindle 110, the pushbutton 165 connected to the actuator blade 155 is depressed causing the forward edge surface 156 to cam the actuator rod 90 downwardly thereby shifting the clutch gear 78 downwardly until the bottom lugs 105 on the clutch gear 78 engage the upper tapered surfaces 103 of the pins 102 to restrain rotation of the clutch gear 78 and feed gear 125. When the feed gear 125 is restrained, continued rotation of the spindle 110 causes the spindle to retract due to the left-hand external thread 114 on the spindle 110.

When the spindle 110 approaches a fully retracted position as determined by the location of the collar 132, lug 135 engages the lug 136 on the lower end of the feed gear 125 thereby rotating the feed gear and the clutch gear 78 causing the lugs 105 to be cammed upwardly from the tapered ends 103 of the pins 102 to shift the clutch gear 78 back into its neutral position.

When it is desirable to advance the spindle 110 at a rate substantially faster than its predetermined positive feed rate, the actuator blade 158 and corresponding pushbutton 165 are depressed causing the forward edge surface 159 to force the control rod 46 downwardly. The downward movement of the disc portion 47 shifts the gear 50 downwardly until the lug 56 engages the lug 57 on the continuously rotating gear 58. Since the gear 50 rotates substantially faster than the gear 36 and remains permanently in mesh with the clutch gear 78, the feed gear 125 is rotated substantially faster than the drive gear 118 thereby producing rapid advancement of the spindle 110.

When the machine bit engages the workpiece W, the resistance causes the clutch gear 78 to slow down to the same speed as gear 118 and spindle 110, and the gear 50 to slow down and resist being rotated by gear 58. This causes lugs 56 and 57 to cam the gear 50 upwardly against the bias produced by the manually depressed actuator blade 158. If the actuator blade 158 is not released, a pulsing sensation is detected by the finger as a result of repeated engagement of the lugs 56 and 57 thereby indicating that the tool bit has reached the workpiece W.

From the drawings and the above description, it becomes apparent that a portable power tool constructed in accordance with the invention provides desirable features and advantages. For example, by providing for rapid advancement of the spindle 110 in response to engagement of the high-speed gear 50 with the gear 58, the tool can be employed for efficiently and effectively drilling deep holes in a workpiece. That is, the spindle 110 can be quickly retracted at any point during a drilling operation for cleaning chips from the hole simply by depressing actuator blade 155. The spindle can then be rapidly advanced by depressing actuator blade 158 for moving the drill bit quickly back into the hole.

Another important feature is provided by the cooperation of the adjustable collar 138 and the thrust washer 142 for precisely controlling the bottom limit of the stroke of the spindle 110. That is, the collar 138 provides for precise depth control while the cooperation of the lugs 74 and 76 and the detent between the balls 97 and groove 93 provide for automatically disengaging the clutch gear 78 at the end of the feed stroke. Adjustment of the setscrews 99 within the holes 96 controls the torque buildup between the gears 68 and 78 thereby assuring a predetermined axial drilling thrust availability during the drilling cycle. When collar 138 engages washer 142 the forward feed of the spindle 110 ceases and gear 125 tightens the parts 123, 118, 122, 144, 143 and 142 until the tension in the upper part of the spindle 110 gripping these parts is equal to the predetermined axial thrust. At this time, the drill point will have cleaned up the hole and no thrust will appear in the drill. As mentioned above, this tightening will cause the necessary torque buildup between gears 68 and 78 to cam gear 78 into its neutral position. When the spindle 110 is retracted, however, the cooperation of the lugs 135 and 136 effects rotation of the feed gear 125 and clutch gear 78 for automatically camming gear 78 upwardly into the neutral position to stop retraction of the spindle. Lugs 135 and 136 are so placed that they always contact on their flanks to produce a pure torsional contact and drive between collar 132 and gear 125 to eliminate the axial tightening of these two parts on spindle 110 and thereby minimize the initial torque required by gear 50 for rapid advancement.

Another important feature is provided by the use and arrangement of the actuator blades 150, 155 and 158 and the corresponding pushbuttons 165. That is, the entire operation of the power tool can be controlled by depressing one of the three pushbuttons 165 each movable in a direction parallel to the axis of the motor 10. Thus when the tool is jig mounted in an area which is not easily accessible, the operation of the tool can be conveniently controlled without the operator moving his hand close to the rotating spindle and drill.

While the form of apparatus herein described constitutes a preferred embodiment of the invention, it is to be understood that the invention is not limited to this precise form of apparatus, and that changes may be made therein without departing from the scope of the invention.

What we claim is:

1. An improved power tool comprising a housing, a rotatable spindle disposed within said housing and having external threads, means supporting said spindle for axial movement relative to said housing, a drive gear mounted on said spindle for rotation therewith, a motor secured to said housing and having a shaft, gear means connecting the shaft of said motor to said drive gear to effect rotation of said spindle in response to rotation of said motor shaft in one direction at a selected speed, a feed gear mounted on said spindle and having internal threads engaging said external threads, means engageable with said gear means for driving said feed gear at a first predetermined speed relative to said drive gear to effect positive axial feeding of said spindle in response to rotation of said motor shaft in said one direction and at said selected speed, means engageable with said gear means for driving said feed gear at a second predetermined speed relative to said drive gear while maintaining the rotation of said motor shaft in said one direction and at said selected speed to effect rapid advancement of said spindle, means for restraining rotation of said feed gear relative to said housing to effect rapid retraction of said spindle, and selectable control means for operating said driving means and said restraining means.

2. A portable power tool as defined in claim 1 wherein said spindle extends through said housing and is positioned with its axis extending substantially perpendicular to the axis of said motor shaft, and said means for driving said feed gear at said second predetermined rate comprises a high-speed gear having a diameter smaller than that of said feed gear and shiftable in a direction parallel to the axis of said spindle.

3. A portable power tool as defined in claim 1 wherein said spindle includes a first end portion adapted to be connected to a tool bit and a second end portion projecting outwardly from said housing, a collar threadably mounted on said second end portion of said spindle, stop means mounted on said housing and engageable by said collar to effect a positive stop to axial advancement of said spindle, and cam means for automatically disengaging said driving means for said feed gear in response to a predetermined torque resistance effected by said feed gear.

4. A portable power tool as defined in claim 1 wherein said control means include a plurality of generally flat parallel cam members each movable in a direction substantially parallel to the axis of said motor shaft.

5. A portable power tool as defined in claim 1 wherein said means for driving said feed gear at said first and second predetermined speeds comprises a clutch gear movable between a feed position engageable with said gear means rotating said spindle and a retract position engageable with said restraining means through a neutral position, and high-speed gear means for driving said clutch gear in said neutral position to effect said rapid advancement of said spindle.

6. A portable power tool as defined in claim 5 including adjustable detent means for retaining said clutch gear in said feed position, and means for releasing said detent means in response to a preselected axial thrust on said spindle at the end of the feed stroke.

7. An improved compact power tool comprising a housing, a rotatable spindle extending through said housing, means supporting said spindle for axial movement relative to said housing, a motor connected to said housing and having a shaft extending substantially perpendicular to the axis of said spindle, a drive gear slidably mounted on said spindle, gear means connecting the shaft of said motor to said drive gear for rotating said spindle in response to rotation of said motor shaft in one direction, means engageable with said gear means for positively feeding said spindle axially at a first predetermined rate in response to rotation of said motor shaft in said one direction, rapid advance means engageable with said gear means for feeding said spindle axially at a second predetermined rate faster than said first rate while maintaining the rotation of said motor shaft in said one direction to effect rapid advancement of said spindle, means for retracting said spindle relative to said housing, and selectable control means for operating said feeding and retracting means.

8. A portable power tool as defined in claim 7 wherein said gear means for rotating said spindle includes an intermediate gear meshing with said drive gear and including lug means thereon, a clutch gear positioned adjacent said intermediate gear and including lug means on one end, said control means being effective to shift said clutch gear between a neutral position and a feed position where said lug means on said clutch gear engages said lug means on said intermediate gear, said rapid advance means include a high-speed gear for rotating said clutch gear in said neutral position, and means connected to said gear means for driving said high-speed gear in response to actuation of said control means.

9. A portable power tool as defined in claim 8 wherein said high-speed gear includes lug means thereon, a gear driven by said gear means and having lug means thereon, and means for providing relative movement between said latter gear and said high-speed gear to effect selective engagement of said lug means on said gears.

10. A portable power tool as defined in claim 8 wherein said clutch gear and high-speed gear have axes extending parallel to the axis of said spindle.

11. A power tool as defined in claim 1 wherein said spindle includes a first end portion adapted to be connected to a tool bit and a second end portion projecting outwardly from said housing, a collar threadably mounted on said first end portion of said spindle, and means mounted on said collar for rotating said feed gear at the speed of said spindle when said spindle is retracted for automatically disengaging said feeding means.

12. A power tool as defined in claim 7 wherein said control means include a plurality of cam members located generally between said motor and said spindle in laterally offset relation to said gear means, and each said cam member being movable in a direction substantially parallel to the axis of said motor shaft.

13. An improved compact power tool comprising a housing, a rotatable spindle extending within said housing, means supporting said spindle for axial movement relative to said housing, a motor connected to said housing and having an axis extending substantially perpendicular to the axis of said spindle, drive means connecting said motor to said spindle for rotating said spindle, means engageable with said drive means for positively feeding said spindle axially at a first predetermined rate, means cooperating with said drive means for retracting said spindle relative to said housing, a plurality of generally flat cam members for controlling the operation of said feeding and retracting means and located generally between said motor and said spindle in laterally offset relation to said drive means, and each said cam member being movable in a direction substantially parallel to the axis of said motor.

14. An improved compact power tool comprising a housing, a rotatable spindle extending through said housing, means supporting said spindle for axial movement relative to said housing, a drive gear slidably mounted on said spindle, a motor connected to said housing and having a shaft extending substantially perpendicular to said spindle, gear means connecting the shaft of said motor to said drive gear for rotating said spindle in response to rotation of said motor shaft in one direction, means engageable with said gear means for positively feeding said spindle axially at a first predetermined rate in response to rotation of said motor shaft in said one direction, rapid advance means engageable with said gear means for feeding said spindle axially at a second predetermined rate faster than said first rate while maintaining the rotation of said motor shaft in said one direction to effect rapid advancement of said spindle, means for retracting said spindle relative to said housing, said rapid advance means include a movable gear, and control means for moving said gear.